United States Patent
Muscaridola et al.

(10) Patent No.: US 12,322,172 B2
(45) Date of Patent: Jun. 3, 2025

(54) METHOD AND DEVICE FOR THE DETECTION AND CLASSIFICATION OF AN OBJECT

(71) Applicant: DATALOGIC IP TECH S.R.L., Calderara di Reno (IT)

(72) Inventors: Francesco Paolo Muscaridola, Bologna (IT); Paolo Fiorini, Bologna (IT); Nicola Alessi, Bologna (IT); Alessandro Brunetta, Padua (IT); Filippo Franzoni, San Giorgio di Piano (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 668 days.

(21) Appl. No.: 17/311,294

(22) PCT Filed: Dec. 10, 2019

(86) PCT No.: PCT/IB2019/060599
§ 371 (c)(1),
(2) Date: Jun. 4, 2021

(87) PCT Pub. No.: WO2020/121182
PCT Pub. Date: Jun. 18, 2020

(65) Prior Publication Data
US 2022/0019792 A1    Jan. 20, 2022

(30) Foreign Application Priority Data
Dec. 10, 2018    (IT) .................. 102018000010949

(51) Int. Cl.
*G06V 20/00*    (2022.01)
*G06F 18/2431*    (2023.01)
(Continued)

(52) U.S. Cl.
CPC .......... *G06V 20/00* (2022.01); *G06F 18/2431* (2023.01); *G06N 20/00* (2019.01);
(Continued)

(58) Field of Classification Search
CPC .... G06V 20/00; G06V 10/22; G06F 18/2431; G06N 20/00; G06T 7/62; G06T 7/70;
(Continued)

(56) References Cited

U.S. PATENT DOCUMENTS 5,638,465 A    6/1997    Sano et al.
5,818,443 A *  10/1998   Schott ................ G06T 7/30
                                              382/141
(Continued)

OTHER PUBLICATIONS

A glass bottle defect detection system without touching, Hui-Min Ma et al., Proceedings First Int'l Conf. on Machine Learning and Cybernetics, IEEE, vol. 2, pp. 628-632, Nov. 4, 2002 (5 pages).
(Continued)

*Primary Examiner* — Leon Viet Q Nguyen
(74) *Attorney, Agent, or Firm* — The Juhasz Law Firm

(57) ABSTRACT

Method and device for detecting and classifying a not-known object by a device having a two-dimensional field of view. The method includes a learning step, a detecting step and an inspection step. The learning step includes positioning a first known object in a field of view of the device and then positioning a second known object in the field of view of the device, to obtain images of the first and second known objects. Distinctive characteristics and common characteristics of the objects are identified and used to obtain an equality descriptor relative to common elements of the first and second known objects and a difference descriptor allowing association of the first and second known objects to two distinct classes. The device is then used to detect a third, not-known object. The equality descriptor and the difference descriptor are then used in an inspection step to classify the third not-known object.

20 Claims, 10 Drawing Sheets

(51) Int. Cl.
  *G06N 20/00* (2019.01)
  *G06T 7/62* (2017.01)
  *G06T 7/70* (2017.01)
  *G06V 10/22* (2022.01)

(52) U.S. Cl.
  CPC ............... *G06T 7/62* (2017.01); *G06T 7/70* (2017.01); *G06V 10/22* (2022.01)

(58) Field of Classification Search
  CPC . G06T 2207/20081; G06T 2207/30108; G06T 7/0004
  See application file for complete search history.

(56) References Cited

U.S. PATENT DOCUMENTS

| | | | |
|---|---|---|---|
| 6,614,916 | B2 | 9/2003 | MacDonald |
| 6,670,991 | B1* | 12/2003 | Takagi ................... H04N 23/66 348/E5.045 |
| 9,092,841 | B2 | 7/2015 | Silver |
| 2005/0226490 | A1* | 10/2005 | Phillips ................. G06T 1/0007 382/141 |
| 2005/0276459 | A1 | 12/2005 | Eames et al. |
| 2011/0293140 | A1* | 12/2011 | Wagner ................. G06T 7/0004 382/103 |
| 2016/0117837 | A1* | 4/2016 | Baltsen .................... G06T 5/20 382/103 |
| 2016/0300125 | A1* | 10/2016 | Barker ............. G06F 18/24133 |
| 2018/0300865 | A1* | 10/2018 | Weiss .............. G05B 19/41875 |
| 2020/0111236 | A1* | 4/2020 | Tourapis ................. G06T 9/001 |

OTHER PUBLICATIONS

Int'l Search Report for PCT/IB2019/060599, Feb. 27, 2020 (4 pages).
Written Opinion and Int'l Search report for PCT/IB2019/060599, Feb. 27, 2020 (14 pages).
Int'l Prelim Report of Patentability (IPRP) PCT/IB2019/060599, Jun. 8, 2021 (9 pages).
Notification concerning Int'l Prelim Report of Patentability (IPRP) for PCT/IB2019/060599, Jun. 24, 2021 (1 page).

* cited by examiner

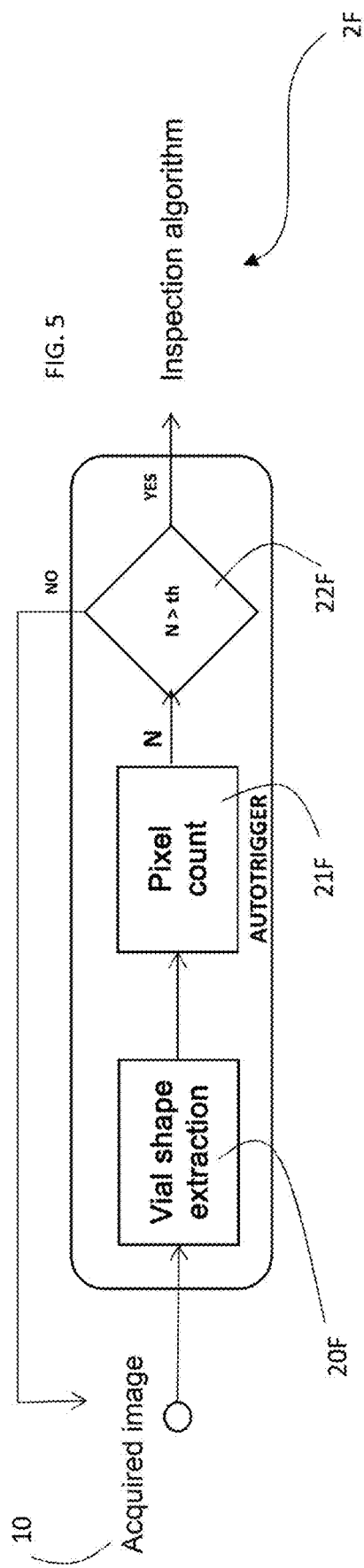
FIG. 5
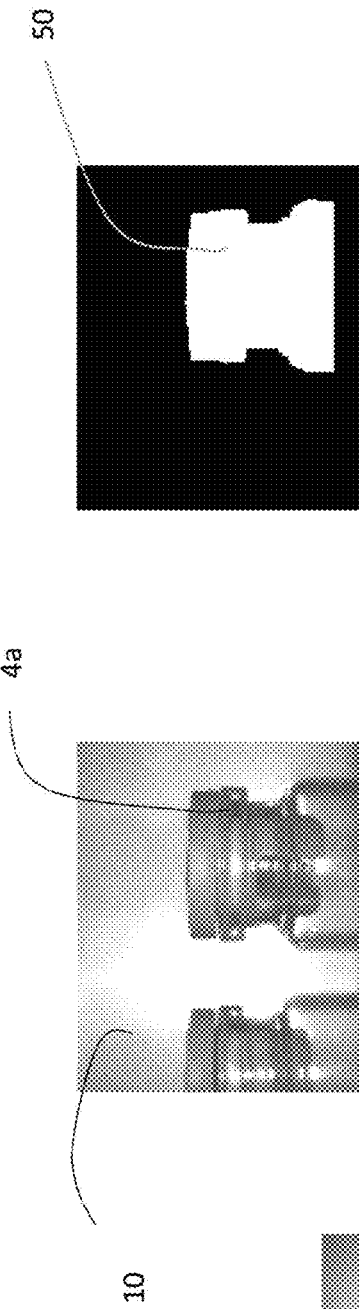
FIG. 6
FIG. 7
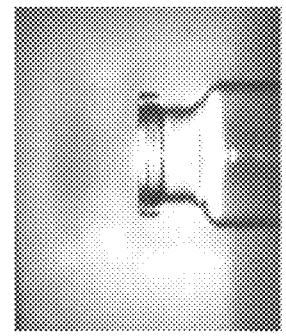
FIG. 6a

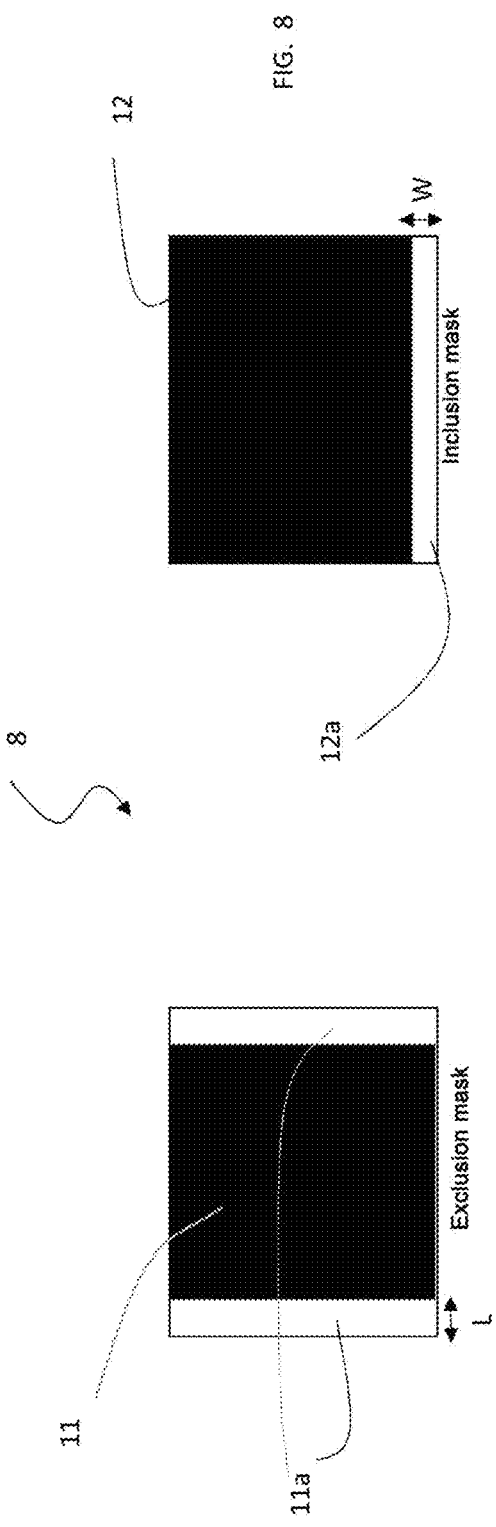
FIG. 8
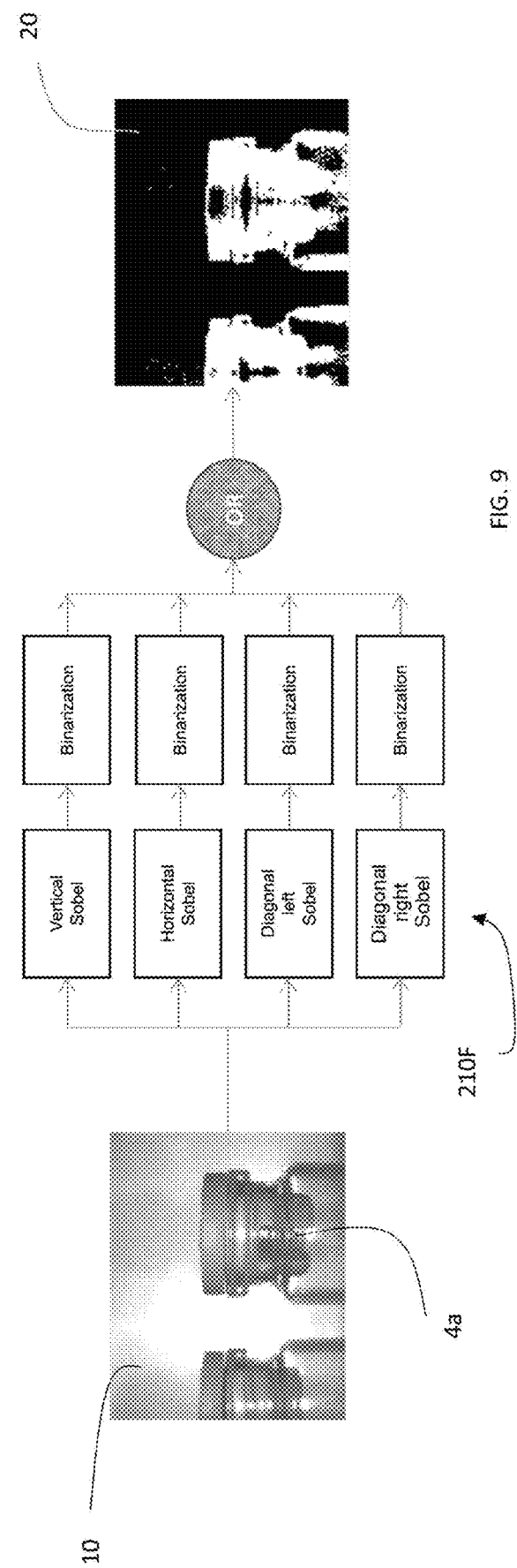
FIG. 9

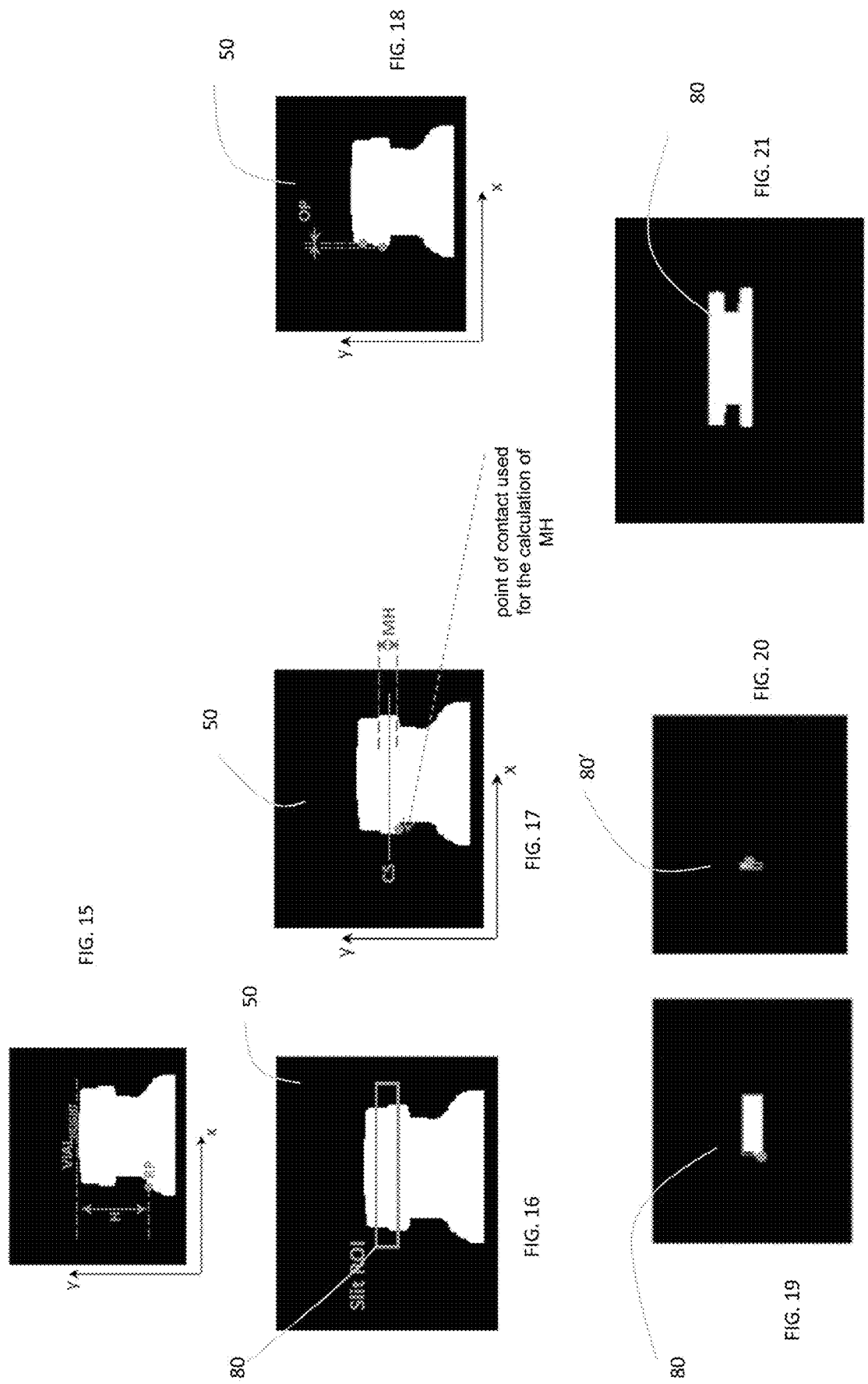

METHOD AND DEVICE FOR THE DETECTION AND CLASSIFICATION OF AN OBJECT

RELATED APPLICATIONS

The present disclosure claims priority to and the benefit of PCT/IB2019/060599, filed Dec. 10, 2019, and to Italian Appl. 102018000010949, filed Dec. 10, 2018; both of these documents are incorporated herein by reference in their entirety.

TECHNICAL FIELD

The present disclosure relates to a method and to a device for detection and classification of an object, in particular classification based on those external characteristics of an object that render the object acceptable rather than "to be rejected."

BACKGROUND

Industrial production is based on the automatic inspection of the objects produced, i.e., inspection that allows for the subdivision of objects as "acceptable" and "non-acceptable." Non-acceptable objects have characteristics that do not allow for the commercialization thereof or in any case the subsequent in-line processing. In this document, the characteristics spoken of are characteristics that affect the external appearance.

One known form of automatic inspection is based on electromagnetic radiation source emitters, usually visible or infrared light, photoelectric receivers and control or processing units adapted to process the signals produced by the receivers.

An example of such known inspections is based on the use of photodetectors or photocells.

A typical photodetector has a light source and a photoelectric sensor which is sensitive to the intensity of the light that is reflected from a point on the surface of an object or transmitted along a path that an object can traverse. Traditional photocells detect the presence of an object with desired characteristics on the basis of the energy that it sends back to the sensor (depending on the color and distance thereof from the material, etc.). The background is distinguishable from the object on the basis of the energy that it spreads towards the sensor, which is much lower than that of the object.

When the difference in energy between the background and the object to be detected is significantly reduced, this is the case wherein the object has become, for example, a colored mark on a white sheet, and so the contrast reader was created and the necessity was rendered evident to introduce a step wherein the reader was made to sample the energy of the background and that of the mark, such that the reader could learn the difference thereof. The detection of the object could in fact no longer be based on the principle that the background would restore light energy that was very different from the mark, but it was rendered necessary to introduce a first teaching step whereof, it was the object (mark) that it was intended to detect ("good" object) and a second teaching step whereof, it was not the object that it was not intended to detect ("no good" object).

When the object to be detected became a multiplicity of marks characterized by specific details such as the dimension or series of dimensions, the bar code was created, wherein the mutual spatial arrangement of the marks was rigidly encoded in order to circumscribe the risk of unduly recognizing a "good" object as a "no good" object. The teaching step described above was replaced by the qualification of one or more encoding methods (EAN13, Code39, etc.). In order to bring this type of detection to a successful conclusion, it was necessary to confer to the photocell the ability to acquire and process in a more sophisticated manner: a multiplicity of sensitive elements and illumination that extended onto a surface of the space in front of the sensor allowed for simultaneous acquisition at a greater number of points and the combination of the information obtained from each of them.

Automatic inspection with photodetectors has several advantages. Photodetectors are inexpensive, simple to set up and operate at high speeds, they also require little user intervention.

Automatic inspection with photodetectors also however presents several disadvantages, in particular, it is not always possible to differentiate between two different objects that are different from each other in regard to several details, without, that is, being limited to pre encoded objects such as barcodes, but extending the inspection to objects of any external characteristics whatsoever.

Another well-known form of automatic optoelectronic inspection uses a device capable of capturing a digital image of a two-dimensional field of view wherein there is an object to be inspected, and then analyzing the image and making decisions. One such device is usually called an artificial vision system, or simply a vision system. The image is captured exposing a two-dimensional series of photosensitive elements for a short period of time, called the integration time or exposure time, to light that was focused onto the array by a lens. The array is called an imager and the individual elements are called pixels. Each pixel measures the intensity of light that falls thereupon during the shutter time. The intensity values measured are then converted into digital numbers and stored within the memory of the vision system such as to form the image, which is analyzed by a digital processing element such as a computer, using methods well known in the art in order to determine the object to be inspected and any characteristics thereof.

Artificial vision systems avoid those disadvantages associated with the use of the photodetectors listed above and in particular they can analyze the most different of objects and can manage uncertain and variable positions of objects.

The systems or vision sensors, however, also have disadvantages compared to photodetectors. Firstly, they are relatively expensive, in any case more expensive than photodetectors. Vision sensors furthermore always require either a configuration step that is much more complicated than that described above (and they also provide specific means which allow interaction with the user that is much more developed than the double pressing of a single button) or else they require an external synchronization signal. Last but not least, they operate more slowly than photodetectors.

The need was therefore felt to implement a photoelectric sensor capable of detecting the presence of desired objects with any characteristics and that was, at the same time, also capable of performing the detection referred to above in the case wherein the objects are moving at high speed in front of the sensor and with substantial insensitivity to the variability of the position and of variations in the characteristics of the object itself. Additionally, the need was felt for this sensor to maintain a great ease of configuration, as per that of a photoelectric sensor (for example, the typical use of the sensor with two successive presses of the same button, having first positioned in front of the sensor the desired object and then the unwanted object). Additionally, it is required that it be autonomous in the performance of the detection function thereof and that it does not require an external synchronization signal during the operation thereof.

The present disclosure solves at least one of the problems presented above.

SUMMARY

This disclosure relates to a method for detecting and classifying a not-known object on the part of a device having a two-dimensional field of view, including: a learning step, comprising: positioning a first known object in the field of view of the device having a first plurality of visual elements and obtaining a first image thereof; positioning a second known object having a second plurality of visual elements in the field of view of the device, and obtaining a second image thereof, said second known object having a visual element of said second plurality distinct from the first plurality and the remaining visual elements of the second plurality equal to those of the first one; identifying a distinct characteristic between said first image of said first object and said second image of said second object and associating thereto a difference descriptor allowing to associate the first known object and the second known object to two distinct classes; identifying a common characteristic between said image of said first object and said image of said second object and associating thereto an equality descriptor relative to common elements between said first and second plurality of visual elements. The disclosure also includes a detection step including: detecting an image of a third not-known object having the first or the second plurality of visual elements; processing said detected image; and accepting said image as a complete image including said first or second plurality of visual elements based on said equality descriptor. The method also includes an inspection step, including: classifying said third not-known object based on an analysis of said complete image and of said difference descriptor.

The present disclosure also relates to a device for the classification of objects, including: a two-dimensional light radiation emitter capable of illuminating a region of the space; a two-dimensional receiver, including an array of photo-sensitive cells, adapted to detect diffuse light energy from an object illuminated by said emitter and adapted to provide an output signal in the form of images as a function of said light energy; a processing unit for the output signal from the receiver, said control unit being programmed to be alternately in a learning mode and in a detection and inspection mode. In the learning mode, the device is adapted to: acquire a first image of a first known object having a plurality of visual elements placed in the field of view of the receiver; acquire a second image of a second known object having a second plurality of visual elements, said second known object having a visual element of said second plurality distinct from the first plurality and the remaining visual elements of the second plurality equal to those of the first plurality; identify a distinct characteristic between said first image of said first object and said image of said second object and associate thereto a difference descriptor allowing to associate the first known object and the second known object to two distinct classes; identify a common characteristic between said image of said first object and said image of said second object and associate thereto an equality descriptor relative to common elements between said first and second plurality of visual elements.

During the detection and inspection step, the device is adapted to: detect at least two images of a third not-known object having the first or the second plurality of visual elements; accept said image as a complete image including said first or second plurality of visual elements based on said equality descriptor; and classify said third not-known object based on an analysis of said complete image and of said difference descriptor.

The disclosure therefore relates to a method and a device for the detection and classification of objects.

The term classification refers to the subdivision of objects into two or more groups based on the visual features thereof. In particular, the classification regards the subdivision of objects as "correct/acceptable" according to an already known correct/acceptable reference object during a learning step, or as previously referred to "good," and for "incorrect/not acceptable" objects, "not good."

The objects of interest are usually all the same and are intended to be controlled, using the device and the method of the present disclosure. For example, one of the objects may have a defect or may not be properly positioned. For example, the objects can be vials, containers or bottles. If the object is a vial, the stopper may not be present or may not be closed properly. Additionally, again with objects that are vials, the stopper can be fitted "the wrong way round" and therefor incorrectly placed. These objects, with a missing stopper, with a stopper that is incorrectly positioned, or incorrectly oriented, are to be considered unacceptable.

Therefore, it is assumed that those objects that are to be classified are substantially always the same, wherein for the most part "everything is correct," whilst with some of them something "is out of place" (present or not present, oriented correctly or not, etc.). Therefore the majority of the external characteristics of the objects, those characteristics that define the external shape thereof, the color thereof, etc., in general, therefore the visual characteristics, are the same. Only some (a few) characteristics will change in the case wherein an object has a defect. The term "not-known" therefore defines an object wherein it is not known whether all of the visual characteristics are acceptable, or it is not yet known whether such an object has visual elements that can be classified as acceptable or unacceptable. In contrast, a known object is such that the classification has already taken place, and it is known whether the visual elements thereof are acceptable or unacceptable.

In the plurality of elements that define the external features of an object, including a "good" object and a "not-good" object, only one or nonetheless a few elements will be different between them. Therefore, given a "classifiable as acceptable" object, defining a first plurality of visual elements (which may include all or only some visual elements that define the exterior of the object), and given an object to be classified as unacceptable comprising a second plurality of visible elements, the latter must contain, within the second plurality, at least one distinct visual element from amongst those of the first plurality of the acceptable object, the other remaining visual elements of the second plurality are equal (referring precisely to the same objects) to those of the first plurality.

The first or second plurality of elements do not define all of the visual elements of the object. They define a part of the object, but that part that is required in the classification. For example, in the case of a vial with a stopper, the visual elements may include the size and shape of the upper part of the vial and of the stopper, nothing is considered with regards to the lower part of the vial, of the color of the same, etc.

The not-known object also has a plurality of visual elements, which may be firsts (good object) or seconds (not good object) and the aim of the classification is precisely to understand whether the plurality of visual elements of the not-known object of interest are the first or the second plurality.

The device comprises a two-dimensional emitter of light radiation. For example, this emitter may be one or more LEDs. The emitter emits this radiation, preferably in the visible or infrared light spectrum, within a certain area or volume.

Furthermore, the device includes a receiving device. The receiving device comprises an image sensor, such as an array of photodetectors, or cells, each whereof can define one "pixel" of a matrix. The reception device includes, in addition to the photodetectors, an optical receiving element (optical group) comprising one or more lenses. Said optics determine the usable field of view and depth of field for reading. An optical group is also present at the emitter device in order to obtain the desired shape of the light beam.

The device preferably also includes a tracking system that makes it possible to correctly identify the field of view of the device.

The device may also include a focusing device.

The optical emission and reception are considered per se to be known in the art and not further analyzed.

The receiving device detects the diffused light energy from an object illuminated by the emitter device which is located within the field of view of the device. This light energy is dependent on the visual characteristics of the object or on the visual elements thereof. If the visual elements of the object change, the light energy that strikes the array of photodetectors also changes.

The receiving device, as a function of the light energy received, in turn, emits a signal, in a known manner, that is dependent thereupon. Said signal forms an image.

Therefore, for each object illuminated within the field of view of the device, an image may be obtained of the same.

The device furthermore includes a processing unit that is adapted to receive and appropriately process the signal emitted by the receiving device. The processing unit may be centralized, or it may include a plurality of processing units, each associated with one cell of the array. This processing unit, by means of the operations described below, is able to classify the object detected as either "good" or "not good," as exemplified above.

In order to perform this classification, the processing unit performs two functions. It executes a first learning function, wherein from known images, i.e., by means of the analysis of images of known objects, it extracts characteristics of the images of known objects, in order to obtain a descriptor or a set of predefined descriptors from the acquired image.

The second function is that of detection and inspection (or classification) wherein it is capable of acquiring a plurality of images of a not-known object in order to classify it. The detection step is performed in recognizing amongst all of the images that can be acquired by the detector, only those wherein the not-known object is located within the field of view of the device and the acquired image includes all of the visual elements (the first or the second plurality) that make it possible to determine whether the object is or is not good, i.e., they make it possible to correctly classify the object. Therefore, preferably, an image is a complete image if it includes all of the first or all of the second plurality of visual elements of the not-known object. These images, that contain all of the visual elements that are required for the classification of the object, are called complete images. The task of the detection and inspection step is to select the images from amongst all of the images acquired.

After determining that an image includes all of the visual elements of an object that make it possible to determine the classification thereof, the true classification takes place. In the case wherein the same object has more than one complete image that contains these visual elements, the classification is performed in analyzing and combining the results obtained on each individual image of the N in relation to the same object, supplying at the output, also in this case, a single classification result, i.e., Good or No Good. From a comprehensive analysis of the image (or complete images), therefore, the classification is performed, i.e., it is determined as to whether the third plurality of visual elements that belong to the not-known object is the same as the second or the first plurality, in such a way as to classify the not-known object as good or not-good.

In more detail, during the learning step, a first and a second image is acquired by the device. A first image is in relation to a first reference object, wherein all of the features thereof are known. This object is considered to be, for example, a "good" object. It comprises a first plurality of visual elements. It should be understood that it is not necessary for the acquired image of the first object or of the subsequently described objects to be an image of the object in the entirety thereof. It is important that only those elements of the object that make it possible to discern whether it is within one classification, rather than another one, are present within the image. Therefore, given an object, the images may, for example, be in relation to only the upper part of the same, from mid-height upwards.

For example, if the problem to be detected is whether there is a stopper that closes a bottle, the only relevant portion of the bottle that is necessary to investigate is the upper portion of the same.

An image is then acquired of a second reference object. This object is of the same type as the object that was previously acquired in a first image, but it has the problem to be detected, for example the lack of a stopper. This second reference object is, therefore, an object that must be classified as not-good. The visual elements between the first and the second object are therefore almost all the same (the object being practically the same), except for an element, or at least one element, which differs, for example the absence of the stopper. The second object therefore defines a second plurality of visual elements that are equal to those of the first object, with the exception of one.

This acquisition of the first and of the second reference image is preferably performed by means of the positioning within the framed field of view of the device, correctly identified by the pointing system, of the two objects. Preferably, this acquisition is performed in a sequential manner. More preferably, it is performed in a simple way, for example by pressing a button. During this step, upon the occasion of the acquisition of the image of the first GOOD object, the device preferably also performs the auto configuration of the photometric parameters (exposure time and gain) and the calculation of the parameters for optimum focusing. This auto configuration is preferably performed without any need for intervention on the part of the user.

This learning step therefore includes the successive positioning in front of the device, within the field of view thereof, of a first and a second known object. The algorithms present within the processing unit, after the object (first or second) has been positioned within such a field of view by the user, do not require additional external intervention. When the first object is correctly positioned, a button is pressed and the acquisition step of the first image is automatically performed. When the second object is correctly positioned, a button is pressed and the acquisition step of the second image is automatically performed.

Manual intervention is no longer required, neither is it required for the subsequent step of processing the images together with the calculation of the descriptors (see below).

Once the reference images have been acquired (the first and second images) of the good and not-good objects, the processing unit processes said images. These images can be transformed in many ways, for example in utilizing standard image processing tools. The editing options are for example:
- binarizations of the image. The fundamental idea is to perform a separation or split, i.e., to trace a demarcation line within the histogram of the image. The aim is, therefore, to find a suitable threshold and to affirm that all of the points of the image wherein the luminous intensity thereof is below such a threshold will assume a value of 0 (black) and all of the points with an intensity that is higher than this threshold will assume the value 255 (white) or vice versa.
- edge detection of the image. Edge detection is used with the aim of marking all of those points of a digital image wherein the light intensity abruptly changes logical combinations of the image.
- linear transformations of the image.

From the processed images thus obtained, which are nonetheless a function of the first and second reference images, the processing unit obtains a first and a second descriptor. In technical language the descriptors in question are referred to as image descriptors, or "visual descriptors."

A first descriptor is said equality descriptor and depends on characteristics that are common to the two first and second reference objects, i.e., on those visual elements that are equal between the first and the second reference objects. In other words, the equality descriptor depends on those visual elements that are common to both of the reference objects. Obviously, this descriptor is obtained from an analysis of the first and second images or of the relative processed images.

One type of descriptor could, for example, be the width of the first and second object, which, if the problem to be detected is the lack of a stopper, remains the same both in the GOOD object and in the NO GOOD object. Essentially therefore, the equality descriptor depends on those features which are the same or similar within the first and second image of the reference objects, whether they are processed or not.

Additionally, a second descriptor that is obtained is a difference descriptor. This descriptor depends on those differences which are present between the first and the second image and which are caused by that visual element that differs between the first and the second reference object. Also in this case, the descriptor can be found either by analyzing the reference images as they were acquired, or by analyzing the successively processed images.

Therefore, during the learning step, some transformations are applied to each of the two first and second images in order to extract a difference descriptor, i.e., a set of information that makes it possible to associate the two objects with two distinct sets/classes, and one of equality, relating to elements that are common between said first and second plurality of visual elements.

A descriptor is composed of a characteristic or a set of characteristics such as:
- histograms of the image, for example in calculating the histogram of the first and second image, the equality descriptor comprises one or more of: the histogram average (if it is the same between the two calculated histograms), the variance (if it is the same between the two calculated histograms), the skewness (if it is the same between the two calculated histograms), and so on.
- the number of blobs within the image,
- the area of the largest blob within the image,
- the average of the gray levels,
- corner extraction,
- edge extraction. In this case, one or more parameters such as the average intensity, the average edge direction, the positions, the number of pixels above a threshold, the position of those pixels that are above a threshold, etc., are extracted from the edge calculation In addition or alternatively, the histogram itself is calculated therefrom, for example some extracted grayscale edges, in extracting the histogram characteristics cited previously at the first point,
- and others.

The descriptors are also obtained automatically by the device, without any intervention on the part of the user.

Once the descriptors are obtained, the processing unit switches to the detection and inspection step.

During the acquisition step, the device acquires a plurality of images wherein the content thereof is not known in advance, i.e., these images could contain one good object, one not-good object, or else they may not contain an object, or else only a portion thereof which is insufficient to discriminate the class whereto it belongs. Preferably, the not-known object is not in motion and therefore the image is acquired whilst the object moves within the field of view of the device. Preferably a plurality of objects is envisaged that go by within the field of view of the device.

However, particularly when the object is in motion, the images acquired by the processing unit do not always contain the object in the entirety thereof and in particular they do not always contain all of the visual elements that are necessary in order to determine the classification of the object. Therefore, the images that are acquired are processed and only one or more images that contain the object in the entirety thereof (in the entirety therefore is intended to mean, wherein all of those visual elements are visible that make it possible to determine the classification) are inspected.

In order to discern between all of the captured images only those that contain the object in the entirety thereof, the equality descriptor, that is obtained during the learning step, is utilized. The images are, therefore, analyzed or processed in order to compare them with the equality descriptor, or to utilize the equality descriptor in the processing, and by means of comparison or calculation, those images that are complete are determined. The complete images are those that are inspected during the subsequent step.

The (complete) image or images that can be inspected are then further processed during the subsequent step, of inspection.

The difference descriptors extracted from a such complete image/s are the inputs, for example, of:
- a support vector machine (SVM)
- a neural network or
- a linear classifier from which emerges a classification of the not-known object present within the complete images that were the output of the detection step.

In other words, this "not-known" object possesses a third plurality of visual elements that may correspond to the first plurality of visual elements of the good object or to the second plurality of visual elements of the not-good element. As mentioned, between the first and the second plurality there is a visual element of difference. This inspection step serves to determine to which class the not-known object belongs.

In this way, the method and apparatus disclosed herein, although based upon relatively complex technology, can identify complex objects such as the lack or the erroneous positioning of components of objects, also in motion. However, the simplicity of use of the photodetectors is maintained as well as the lack of external triggers, insofar as the trigger step in the device is automatic, and of graphical user interfaces.

Preferably, the detecting of an image of a third not-known object having said plurality of visual elements includes: moving said third object within the field of view of the device. In production lines, objects notoriously go by along the line in a direction of movement (such objects can be guided, for example by a mechanical arm, or they may be free, therefore going by on a conveyor belt). Therefore, preferably, the acquisition of images of the third object or of the plurality of third objects occurs continuously whilst the same objects go by.

Preferably, the method includes the step of emitting a signal based on said classification of said third object.

Preferably, the state itself of the device changes in the case wherein an object is classified as not-good. For example, an alarm signal can be sent to a user.

Preferably, the method comprises the step of processing said first or said second image by means of one or more of:
thresholding,
binarization,
edge detection,
logical combinations of the image,
linear transformations of the image,
in order to obtain said equality descriptor or said difference descriptor. The descriptors in some way "summarize" the equal or different characteristics between the good reference object and the not-good reference object. The images are therefore processed in such a way that these differences and similarities are easily detected using a given parameter, which is the descriptor.

Preferably, the step of accepting said image as a complete image including said plurality of visual elements on the basis of said equality descriptor includes:
Determining a two-dimensional shape of the third object within the image;
Accepting said image as a complete image if a number of pixels within the two-dimensional shape is above a threshold.

The threshold, for example, can be obtained as a descriptor or else the manner wherein the image is processed before being compared with the threshold can be obtained by means of the equality descriptor.

Preferably, the step of accepting said image as a complete image including said plurality of visual elements on the basis of said equality descriptor includes:
Determining the presence of a blob and/or a blob dimension within the image of the third object;
Accepting said image as a complete image if said blob is present or the dimension thereof is greater or less than a threshold value.

Also in this case, the presence of blobs, the size thereof or the manner wherein the blob value is obtained can be obtained by means of the equality descriptor.

Preferably, the step of classifying said third not-known object on the basis of an analysis of said full image and of said difference descriptor includes supplying as input said complete image and said difference descriptor to an algorithm of:
a support vector machine (SVM), or
a neural network, or
a linear classifier.

Preferably, the step of positioning a first known object within the field of view of the device having a first plurality of visual elements and obtaining a first image thereof includes one or more of;
determining parameters for the appropriate focusing of said first object;
configuring photometric parameters including exposure time and gain.

Preferably, during the step of acquiring the reference images, the best conditions for the acquisition of "good" object images are determined and set.

Preferably, said visual element of said second plurality that is distinct from those of said first plurality includes alternatively:
the presence or absence of a stopper;
the opening or closing of a stopper;
distinct orientations and/or positions of a stopper.

The method disclosed herein is particularly accurate for the distinguishing of vial stoppers, whether they are or are not present or positioned incorrectly.

Preferably, said step of identifying a common characteristic between said image of said first object and said image of said second object and associating thereto an equality descriptor relative to common elements between said first and second plurality of visual elements;
Creating a mask comprising a plurality of areas, said mask being appropriate when associated with said image of said third object, for selecting areas of the third image to maintain and third areas of the image to be discarded.

These masks are substantially adapted to select only "relevant" areas of the image of the not-known object in such a way as to subsequently process only those areas and to not waste processing time on areas of the image that are not relevant to the future classification.

Preferably, the device includes a result management unit that is adapted to change the state of an output of the device based on the result obtained from the classification. According to whether the not-known object is, on the basis of the performed classification step, good or not-good, the state of an output of the device is changed.

BRIEF DESCRIPTION OF THE DRAWINGS

The disclosure will now be made in detail with reference to the accompanying non-limiting drawings wherein:

FIG. 5 represents a detail view of a further step of the method;

FIG. 6 represents an image from the image sensor of FIG. 1 of a "GOOD" object;

FIG. 6a represents an image from the image sensor of FIG. 1 of a "NOT GOOD" object;

FIG. 7 represents an image processed during a step of the method;

FIGS. 8, 9, 9*a* and 10 represent details of the step of the method of FIG. 5;

FIG. 12*a* represents a scheme in greater detail of FIG. 12;

FIG. 15 represents a detail of the step of the method of FIG. 4; and

FIGS. 16-21 represent details of the step of the method of FIG. 4;

DETAILED DESCRIPTION

Figure 1:
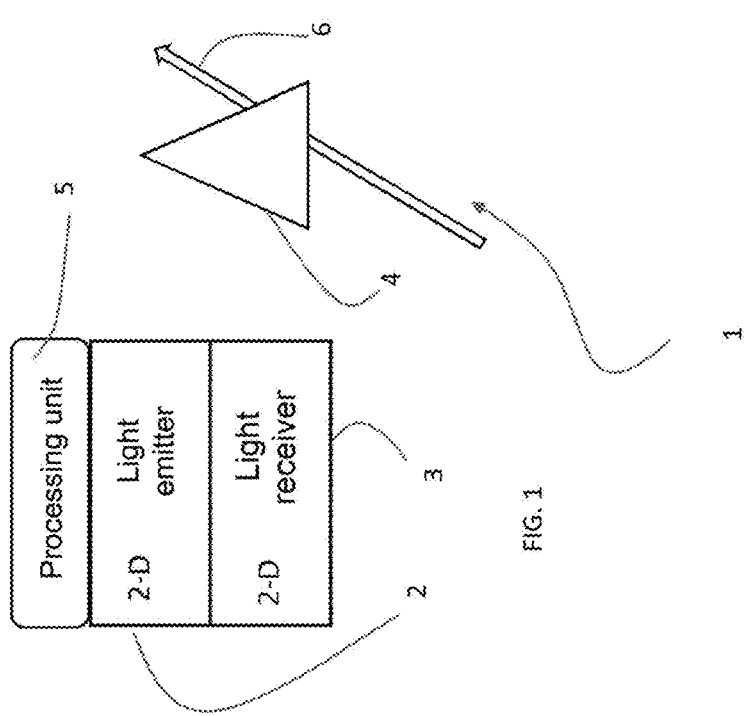
FIG. 1 represents a schematic view of a component of a device including an image sensor according to the disclosure.

In FIG. 1, with the numeral 1 a device for classifying objects according to the present disclosure is indicated in the entirety thereof. The device includes a light source 2, such as an LED, and a receiving device 3, such as an image sensor, for example an array of photodetectors.

The device is preferably an image sensor that is suitable for acquiring images 10 of objects 4 within the field of view thereof, and the illumination and receiving device are within the same housing (represented with a rectangle in FIG. 1).

Objects 4 that are located within the field of view of the sensor 1, as they pass, alter an image acquired by the receiving device 3.

The sensor 1 further comprises a processing unit 5, schematically represented in FIG. 1, that is adapted to receive and process output signals from the photodetectors 3, which represent images of the object 4. A typical image is that shown in FIG. 6. The object 4 may preferably be in motion whilst images are acquired, for example, it can be arranged upon a conveyor belt 6.

Figure 2:
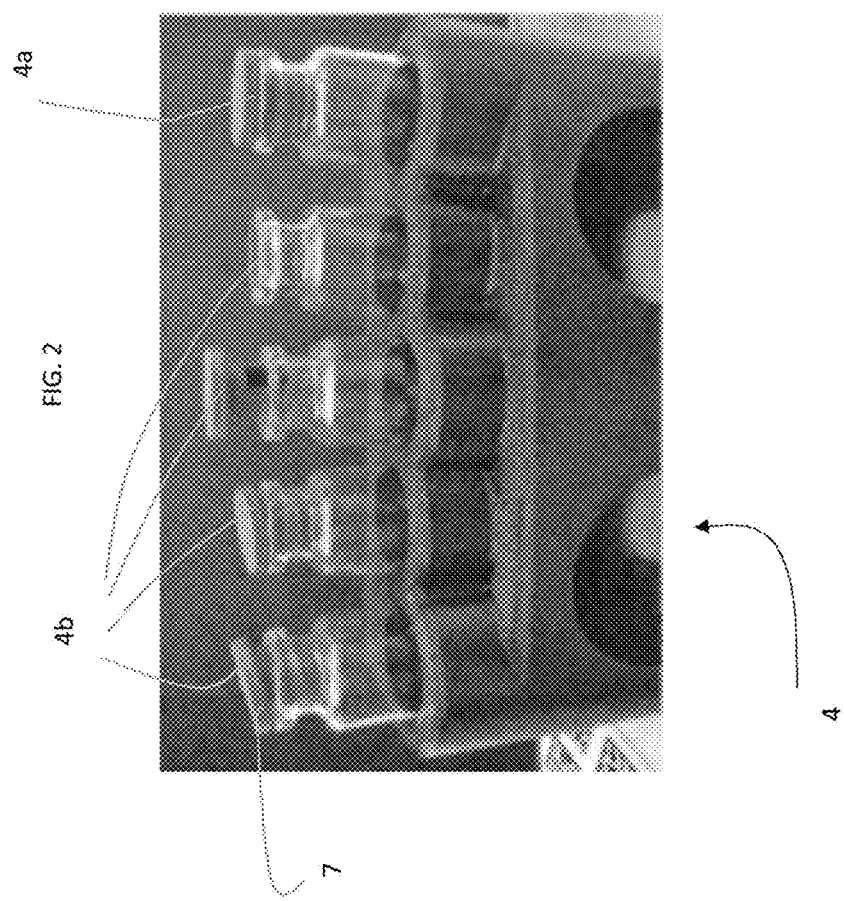
FIG. 2 represents an image of a multiplicity of reference objects, some of them being "good" and others "not-good"

The type of object that is detected is preferably of the type shown in FIG. 2, i.e.; for example vials or bottles. The vials or bottles include a stopper 7. The stopper may not be positioned correctly or may not be positioned at all. The objects present on the conveyor belt, therefore, are divided into two categories:

Objects 4*a* wherein the stopper is correctly seated on the vial;

Objects 4*b* wherein the stopper thereof is not correctly seated on the vial.

In the method, preferably, a single "error" at a time is detected. In other words, the sensor 1 is adapted to detect a single defect, thereby amongst the objects wherein the stopper is not correctly seated, those objects are distinguished wherein the stopper is not completely positioned inside the bottle, to the extent wherein they are absent, and those objects wherein the stopper thereof is rotated (the latter defect does not apply to those vials in question having a 360° symmetrical stopper, but is instead found with other containers such as bottles).

For each of these issues, which represent a distinct visual element between a correct object 4*a* and an incorrect object 4*b*, a different classification is performed (i.e., different classes are created and the procedure indicated below must be repeated for each type of defect).

They are therefore two classes: an object with a correct stopper 4*a* and an object with an incorrect stopper 4*b*. The two classes differ by one visual element. In this specific case, the visual element includes one visual characteristic of the stopper. It is, for example, "absence of the stopper" or "incorrect positioning of the stopper" or "rotation of the stopper."

Figure 3:
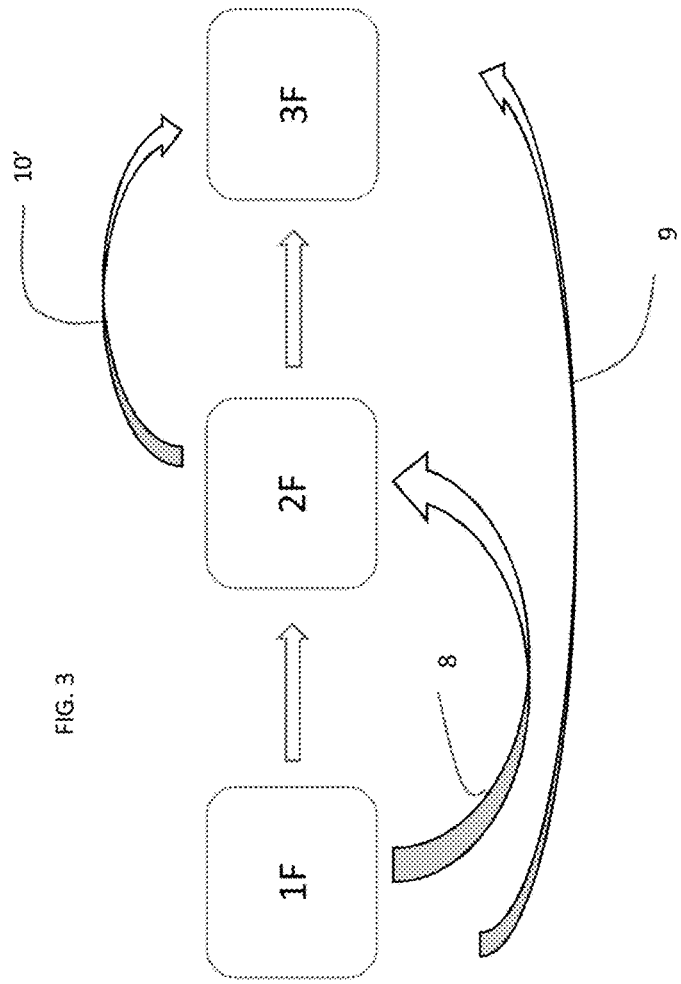
FIG. 3 represents a block diagram of the steps of the method according to the disclosure.

Given the images 10, of the type of FIG. 6, of the objects 4*a* or 4*b*, the processing unit 5 is suitable for performing the method according to our disclosure. The system is represented in FIG. 3. It includes a first learning step 1F, detailed in FIG. 4, a second detection or autotriggering step 2F and a third step of inspection or classification 3F. From the first step 1F, two output values are emitted: an equality descriptor 8 and a difference descriptor 9. The equality descriptor 8 represents one of the inputs of the step 2F, whilst the difference descriptor represents one of the inputs of the step 3F. Obviously, the number of equality and difference descriptors at the output from the step 1F can be arbitrary.

In contrast, from the second step 2F, which receives as input the images 10 and the equality descriptor 8, one or more complete output images 10' are emitted that represent, together with the difference descriptor 9, an input to the inspection step 3F.

Figure 4:
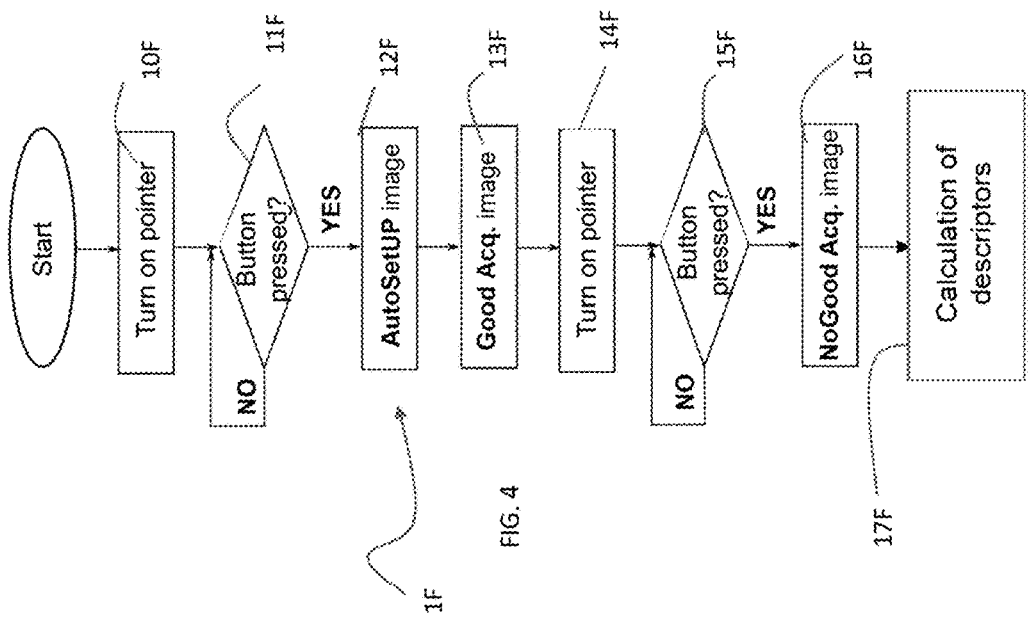
FIG. 4 represents a detail view of a step of the method.

The learning step 1F is represented more in detail in FIG. 4. It provides for the acquisition by the sensor 1 of the two reference images, one in relation to the object 4*a* which should be classified as GOOD and one in relation to the object 4*b* which should be classified as NOT GOOD. For example, the acquired images are of the type of FIG. 6, wherein a "GOOD" object 4*a* can be seen and that of FIG. 6*a* wherein an object of the type "NOT GOOD" can be seen. For example, an object is shown with the stopper and an object without the stopper (see again FIGS. 6 and 6*a*). This acquisition is performed by means of the positioning, within the field of view, correctly identified by the pointing system (steps 10F and 14F), of the two objects 4*a*, 4*b* in a sequential manner (steps 13F and 16F) and with the pushing of a button (steps 11F and 15F). During this step, upon the occasion of the acquisition of the image of the GOOD object (step 13F), the sensor also performs the auto configuration of the photometric parameters (exposure time and gain) and the calculation of the parameters for optimum focusing, without any need for intervention on the part of the user (step 12F).

By means of the processing of these two images that are acquired from the step 1F, the equality descriptors 8 and the difference descriptors 9 are obtained, step 17F of FIG. 4. For example, in the case of the absence of the stopper, the difference descriptor may be a different height of the vials. An equality descriptor may be the width of the bottles, which remains the same in both cases. This height and width is detected from the acquired images.

In detail, during step 1F, masks 11 and 12 are obtained, from amongst the equality descriptors, of the type shown in FIG. 8.

The mask 11 has two "sidebands" 11*a* which represent areas wherein, when the mask is superimposed with the image of an object 4 or one of the transformations thereof, all of the elements that are in contact with the same bands are eliminated. The width L of the bands is calculated in the following manner.

Starting from a fixed pixel value (for example, L=5 pixels), this value is then resized/recalculated as a function of the width of the vial. I.e., once the "Vial Shape" has been extracted, as per the algorithm (described below with reference to the step 2F, the "Vial Shape" represents a binary image wherein the outer contour of the vial or a portion thereof is detected and "filled" in dividing the image into a zone external to the outer shape of the vial and a zone internal to the outer shape to the vial. The shape is a two-dimensional area), the following formula is applied:

$$L = (\text{image width} - \text{width of the vial})/N$$

where N>2 (for example, N=4).

The mask 12 has a band 12a at the lower edge which has a height W. For the calculation of the height W, the starting point is a fixed value W, for example, W=5. This value is then recalculated as a function of the size of the part of the vial present within the image 10 (in particular of the visible portion of the vial within the field of view). In detail, the y coordinate is taken of the lowest and furthest to the left point of the blob of the binary image 70 of FIG. 14 detailed below. If y−ε>W, then W will assume a value=y−ε. For example ε=15.

Figure 14:
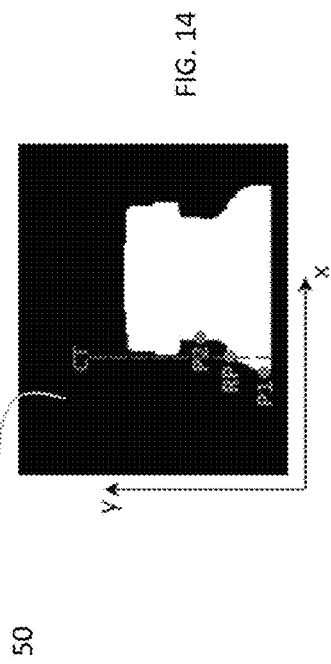
FIGS. 14 and 14*a* represent details of the step of the method of FIG. 4.
Figure 14A:
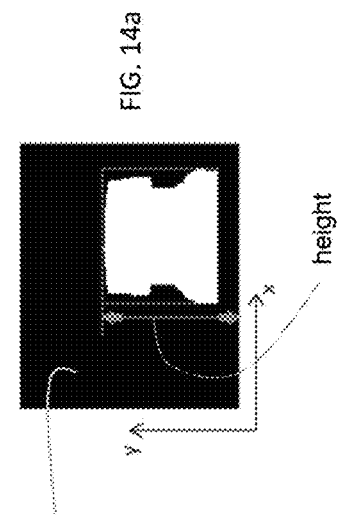

In order to obtain the image 70, the following is performed, as depicted in FIGS. 14 and 14a. The starting point is again the "vial shape" image 50 obtained in FIG. 10 and calculated for both the good object 4a and the not-good object 4b (the calculation of the vial shape is described below with reference to FIG. 10).

As shown in FIG. 14a, the height of the stopper 7 is then calculated. The height of the stopper is considered to be equal to:

Stopper height=height of good object−height of not-good object.

The height of the good object is considered to be the maximum coordinate along the y-axis of the "bounding box," i.e., of the smallest rectangle containing all of the extracted "blob," in this case the "vial shape" of the image 50 of the good object. Similarly, the height of the not-good object is considered to be the maximum coordinate along the y-axis of the "bounding box" of the image of the not-good object.

Figure 10:
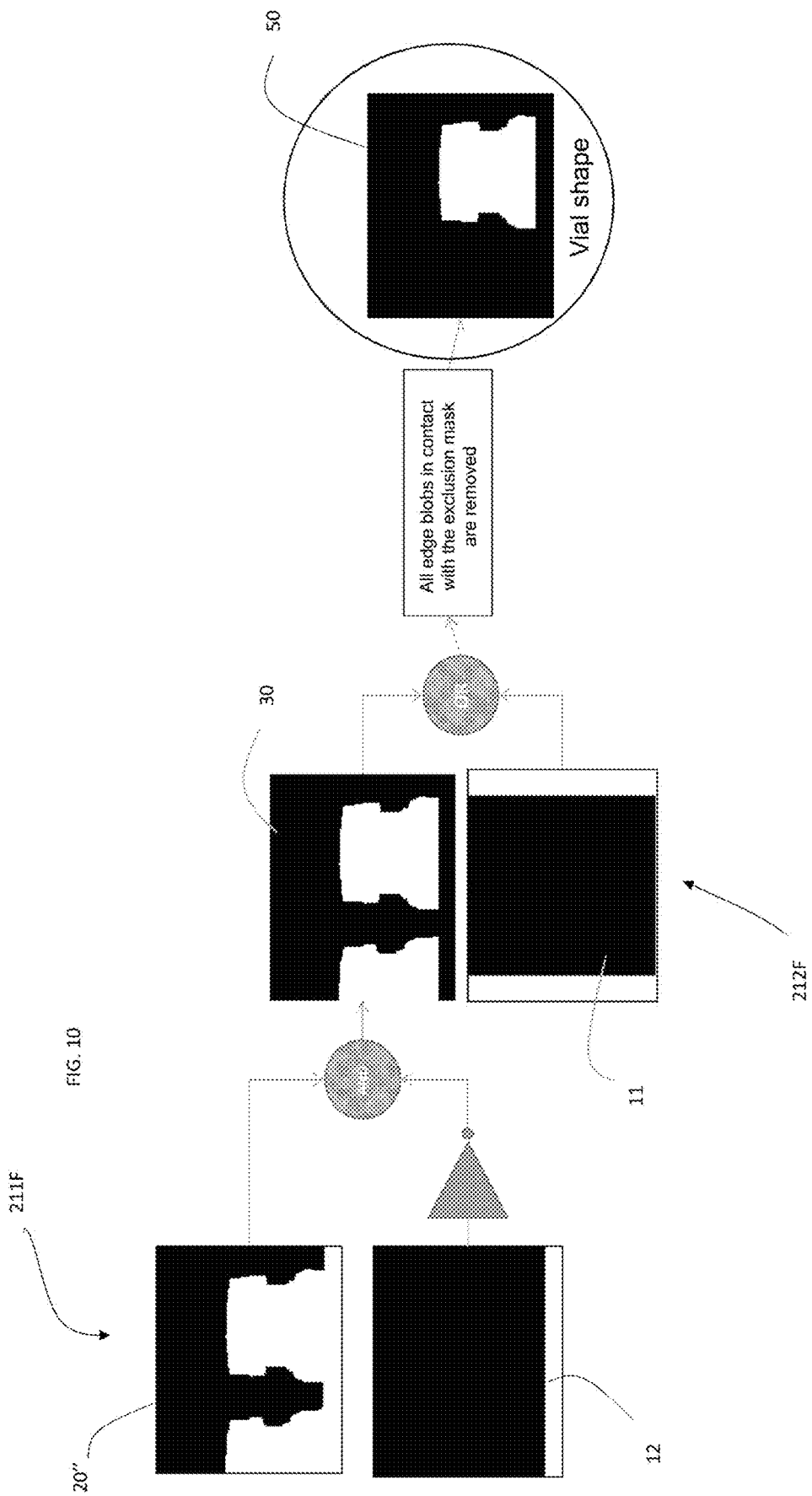

As seen in FIG. 14, once the x and y coordinates are defined within the image 50, as obtained from FIG. 10 and displayed here with the reference points, a cutoff value is searched for, called CT.

The x coordinate of such a cutoff value CTx is given by $$CTx=(P1x-P2x)/2$$

where P1x is the x coordinate value defined by the width of the vial.

P2x is the x coordinate that defines the width of the mouth of the vial.

In order to obtain the points P1x and P2x, the following is performed, again with reference to FIG. 14.

The value of the height is taken of the top of the stopper calculated with reference to FIG. 14a and the shape of the good object is reduced starting from the image 50 by an amount equal to half the height of the stopper. The image 51 is obtained in this way. In 51, only the left half of the binary image 50 has been considered, in relation to the axis of vertical symmetry of the vial. P1x and P2x are then taken as coordinates that are obtained in calculating the significant points within the image 50.

Additionally, amongst the equality descriptors 8, in addition to the masks 11 and 12, also present are:
The number of pixels of the smallest object between the good and the not-good object.

In order to obtain this value the "Extract Vial Shape" operation is performed, i.e., the image 50 of FIG. 10 is obtained both starting from the image 10 of the Good object 4a of FIG. 6 and of the image of the Not-Good object 4b of FIG. 6a, the image is then selected, from between the image 50 deriving from that of the good object and the image 50 deriving from that of the not-good object, with the lowest number of white pixels.

Additionally, amongst the equality descriptors 8 there is also:
width of the vial.

The width of the vial remains identical between the good object 4a and the not-good object 4b.

In contrast, as regards the difference descriptor 9, the following can be considered:
the height of the vial compared to a preset reference point RP The calculation of the height is performed with respect to a reference point which is called RP. The coordinates (x, y) of RP are as follows. The x coordinate of RP is identical to the x coordinate of CT, i.e., CTx=RPx and CPx was described above during the explanation of the equality descriptors 8.

To find the value of y of RP, the intersection is taken of the "vial shape" with the vertical line that passes through CTx.

With regard to the calculation of the height of the vial, reference is made to FIG. 15. A height threshold is calculated:

height threshold=$H$−tolerance $H$=height of the "good" vial−$RPy$ (RPy is the y coordinate of the reference point RP)

tolerance=stopper height/2

This threshold is used in the subsequent inspection or classification step 3F and to determine whether or not the stopper is present. The stopper 7 is considered to be present if the height of a generic vial object, calculated during the inspection stopper, is greater than the height threshold calculated above.

Again, between the difference descriptors 9, the following can be included:
The number of pixels present within the "slit ROI" in the right part of the vial.
The number of pixels present within the "slit ROI" in the left part of the vial.

The absence of a stopper defect is an extreme case of the wrong positioning of the stopper itself. It is therefore possible, within the same procedure, to identify as "not good" both the fact that the stopper is poorly positioned and the case wherein the stopper is absent.

The case of the non-presence of the stopper can be calculated using the above descriptor in relation to the height of the vial with respect to a reference point. Preferably, In order to verify the presence of the slit, a distinct descriptor is used.

This difference descriptor which is used for the recognition of slits is described with reference to FIGS. 16 to 21.

Firstly, it is intended to calculate the coordinate CS in order to delimit the ROI of the slit. The term ROI refers to the English acronym "region of interest" (ROI), which represents a portion of the image, such as a portion of the image 50, which is to be filtered in order to perform further processing or operations thereupon.

The ROI of the slit is used as a difference descriptor during the inspection step 3F in order to determine whether a slit is present between the stopper and the mouth of the vial or whether the stopper is open or closed.

An ROI 80 is then created of the slit, starting from the image of the shape 50, as shown in FIG. 16. The ROI of the slit 80 is nothing more than a bounding box that selects, within the image, a certain portion of the same, in the case in point the area of the vial where the slit may be located (if present).

The highest y coordinate of the ROI Bounding Box 80=good object image height−(stopper height)/2

The lowest y coordinate of the ROI Bounding Box=CS
where CS=not-good object image height−MH*0.6
where MH=vial mouth height These points are represented in FIG. 17.

Initially the width along the x axis of the "ROI bounding box" rectangle is as wide as the vial. As the image is processed, insofar as it is a bounding box, it takes the shape of the blobs that remain therewithin. The point MH is determined by means of another bounding box wherein the left edge thereof is a coordinate between RP (reference point) and the point P2 (for RP and P2 see the image 50 at the top of FIG. 14) in such a way as to vertically intersect the mouth of the vial. The same operation is carried out on the right. Using the height of the not-good vial and calculating the point of contact between this bounding box, described herein, and the shape 50, it is possible to determine MH.

The OP value is then calculated as displayed in FIG. 18. The OP value depends on two x coordinates where between two straight lines, parallel to the y axis, are made to pass. The OP value is calculated as follows. The two points are calculated using the bounding box, as shown in FIGS. 19 and 20. In FIG. 19 the shape can be seen that is derived from image 50 contained within the bounding box 80. The point of contact along the x axis, the bounding box and the shape on the left is the first point PC1x (FIG. 19). The pixels are then inverted within the bounding box of the blob (FIG. 20, bounding box 80' inverted) and the point of contact to the right of the remaining blob in FIG. 19 with the bounding box thereof defines the second point, called PC2x. The points that give the OP value are therefore those points of the background between the two lines passing through PC1x and PC2x, again within the rectangle (bounding box) of FIG. 19, i.e., $$OP = \text{number of pixels between } (PC1x - PC2x)$$

From this is calculated the threshold ST:

$$ST = OP + \text{tolerance}$$

tolerance=defined number of pixels (for example, number of pixels=2)

This ST threshold is used within the inspection step 3F to determine whether there are any gaps between the stopper and the vial.

In FIG. 21 the calculation can be seen of an ROI of the slit 80 in the case of a not-good vial 4b. In particular, FIG. 21 represents a not-good vial whereto the slot ROI has been applied. In this case the value of OP is greater than the value of the ST threshold calculated in step 1F.

In the second step 2F of the method of this disclosure, images of objects are detected wherein the classification thereof is not yet known, which is different from the step 1F wherein the classification of the objects was known. These images 10 are processed in step 2F which at the output has only those images 10 that are called complete and indicated with 10'. These images are images that contain all of the object 4 of interest, they contain in particular the visual elements which allow for the classification thereof, subsequently, by means of the step 3F of the present disclosure.

The step 2F can send, as an input to the third step 3F, a single image 10' or a plurality of images 10'.

An example wherein a single image 10' is sent is represented in FIG. 5. As can be seen, the image 10' only partially contains the object, but it is sufficient in order to perform a classification thereof. The step 2F provides for a first step 20F of extracting the shape 50 of the object, defined as the "vial shape," and then a second step 21F of counting pixels present within the shape 50. An example of the shape 50 is given in FIG. 7 wherein the shape 50 is substantially the outer contour of the object (filled, technically filling step) as present within the binarized image 10.

The number of pixels present within the shape 50 is compared with a threshold called th (step 22F). If the number of pixels contained within the shape 50 is greater than the threshold, then the image 10 wherefrom the shape is obtained is considered to be a complete image 10' and is passed to the classification step 3F, otherwise the image is rejected.

The value th from the learning step 1F, insofar as it is derived from the number of pixels present within the shape extracted from the not-good reference image 4b, in particular that wherein the stopper is absent.

From the learning step 1F further equality descriptors 8 can also be derived, the inclusion and exclusion masks 11, 12 represented in FIG. 8.

In order to obtain the shape 50 of the image 10, the following is performed. With initial reference to FIG. 9, the image 10 is binarized during the step 210F in such a way as to obtain a first processed image 20. The binarization occurs with the application of Sobel filters, which are known in the art, in the vertical, horizontal and two diagonal directions. After the application of these filters and the binarization, the resulting sub-images are combined using OR logic, and the processed image 20 of FIG. 9 is obtained.

Figure 9A:
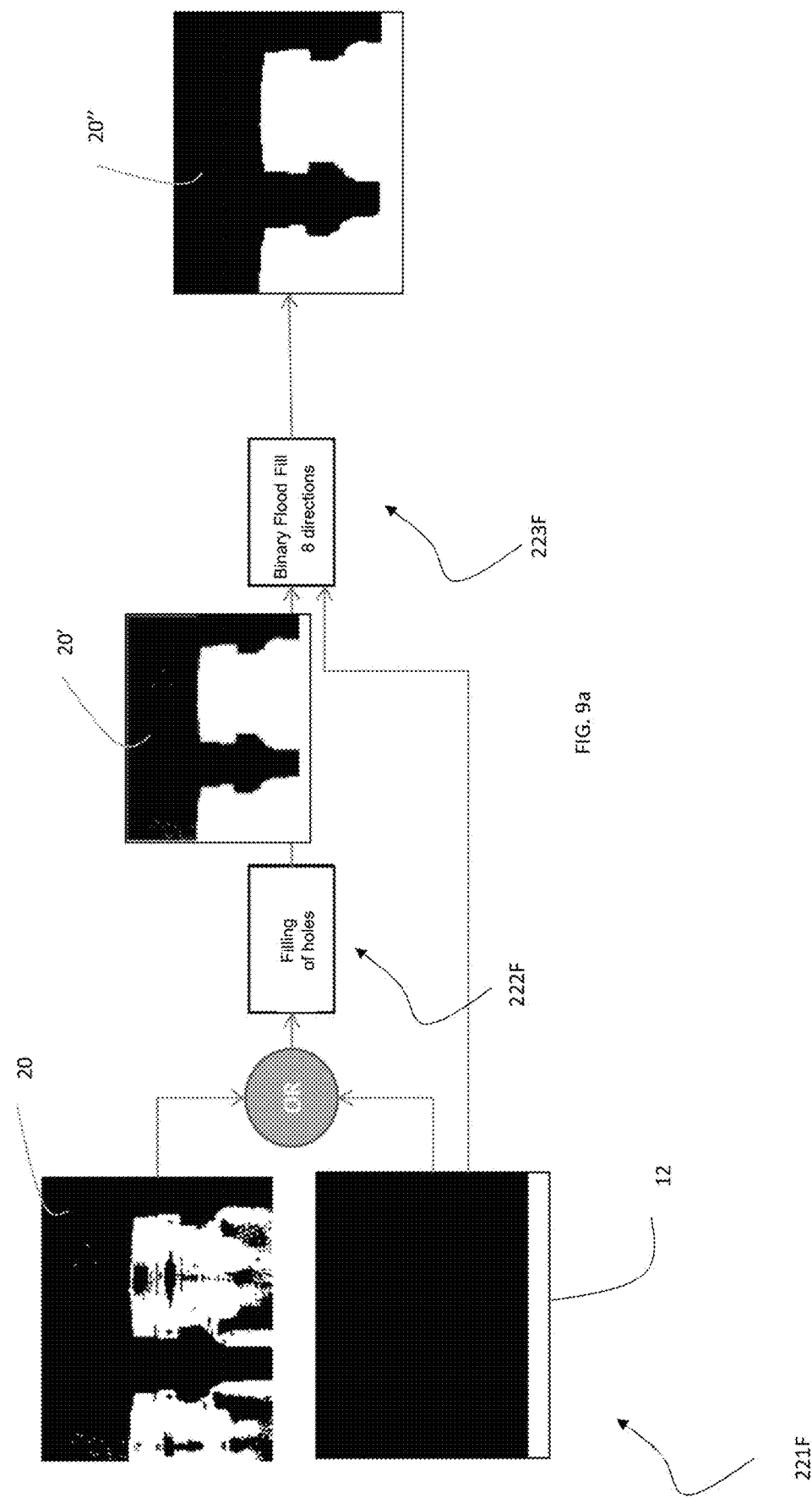

The processed image of FIG. 9 is introduced as an input to step 221F of FIG. 9a. First of all, the inclusion mask 12 is applied using OR logic (step 221F) and in the further processed image (not shown) filling is performed, step 222F. The image 20', thus obtained, is the input to a "binary flood fill" step (step 223F) such as to obtain the image 20".

In FIG. 10 it can be seen how the shape 50 is obtained from the processed image 20", in applying the two masks 11 and 12. First of all the binary inclusion mask is applied using AND logic (step 211F), which is previously negated, and the exclusion mask is applied to the further processed image 30 is OR (step 212F). This leads to the detection of the shape 50. The application of the masks is used to remove the edge blobs from the shape of the image 20. As mentioned in reference to FIG. 5, the pixels of the image are then counted. This type of step 2F can be used, for example, to detect vials wherein the stopper is missing.

Figure 11:
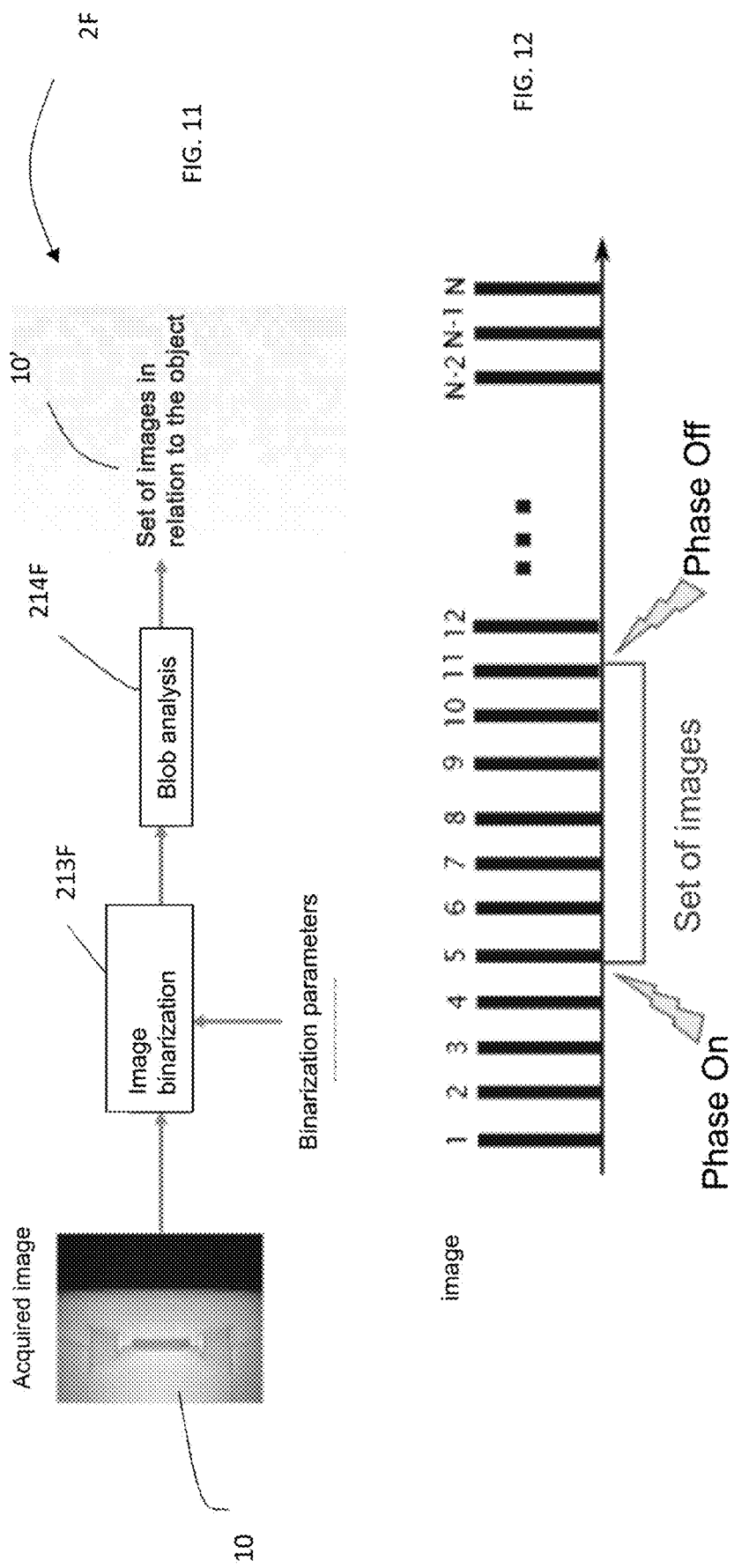
FIG. 11 represents a different preferred example of the step of FIG. 5.

It is also possible that multiple images 10' are supplied from the step 2F to the subsequent classification step 3F. A preferred example of this type of step 2F is given in FIGS. 11-13.

The second type of step 2F is used in the applications of inspection on those bottles wherein, for example, the stopper is oriented or positioned badly. In this case the output of the step 2F is a set of images 10' comprised between the two Phase On and Phase Off events. Such events can be generated in performing a binarization of the acquired images (step 213F) with the subsequent application of a blob-analysis (step 214F). In particular, the Phase Off event is triggered when the condition that triggered the Phase On event is no longer verified (for example: blob absent, the value of the characteristic extracted from the blob-analysis is below the threshold).

Figure 12:
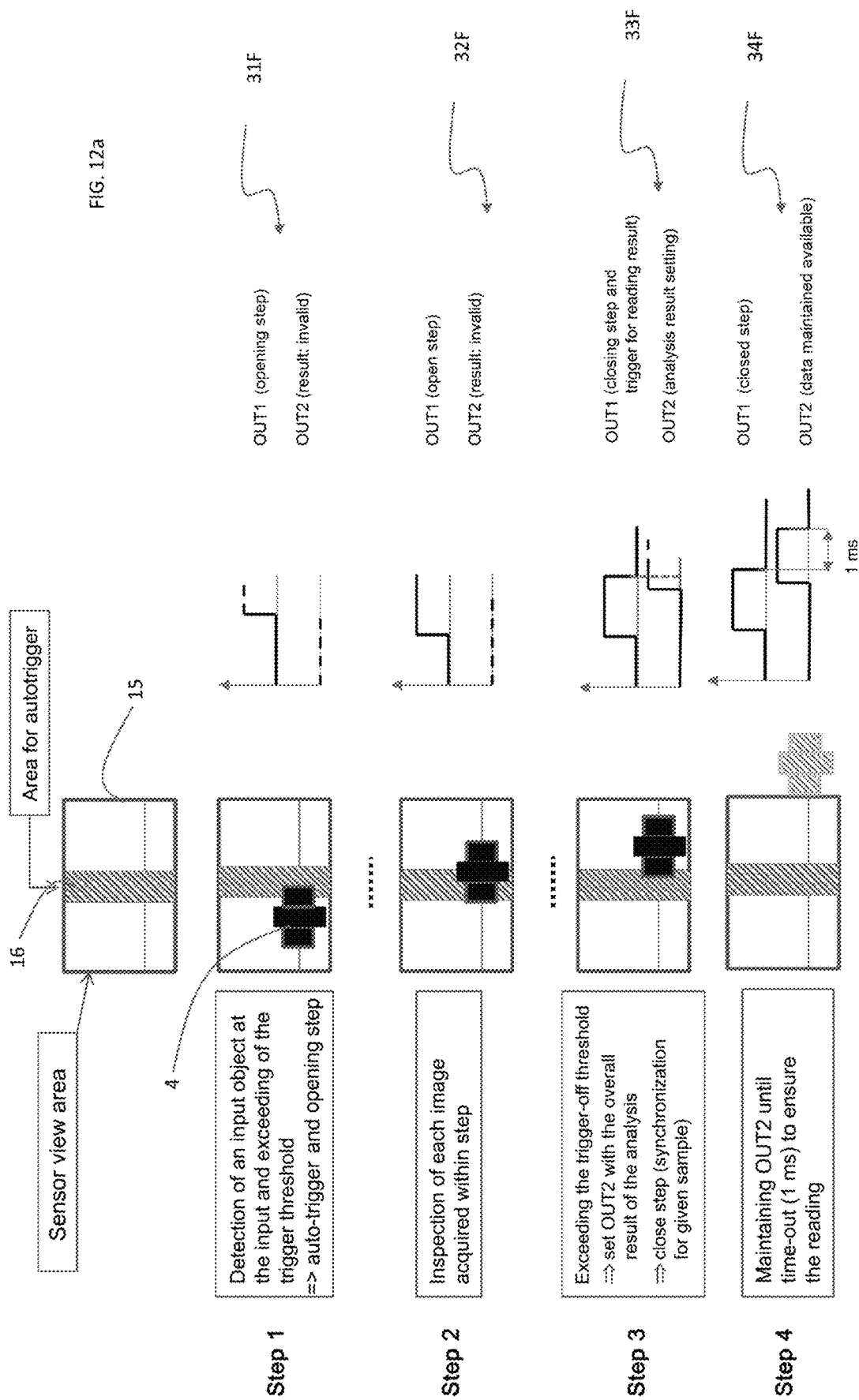
FIGS. 12 and 13 represent details of the step of FIG. 11.

The acquisition of the images in the Phase On/Phase Off is represented schematically in FIG. 12 wherein it shown that all of the images 10 between the Phase On and the Phase Off are sent as inputs to the step 3F. The Phase On and Phase Off represent the occurrence or non-occurrence of a certain event.

This FIG. 12 is represented in more detail in FIG. 12a. In FIG. 12a the field of view 15 is shown of the sensor 1 and a narrower area 16 called autotriggering, wherein the object must be found in such a way that the step 2F can be performed. In the sub-step 31F, an object 4 enters the autotriggering area, and the autotriggering threshold is exceeded (any one of the conditions listed above has occurred). There are thus two signals OUT1: "high," i.e., step initiated and "OUT 2" which represents the result of the processing of all of the images 10 obtained during the autotriggering step. Insofar as the step has just been initiated and therefore not all of the images are available, OUT 2="low" (invalid signal, not all of the images are available because the Phase On has not been completed). The images 10 are continuously produced until the OUT1 signal is "high" (autotriggering verified condition) as in step 32F. At a certain instant the autotrigger threshold is no longer respected and OUT 1 becomes low, the step of capturing the images 10 is then terminated. At the same time therefore, the OUT 2 signal becomes "high" (step 33F) insofar as the acquisition of all of the images has been completed and it is possible to start the processing thereof. The inspection step (OUT 2) remains "high" for a longer length of time (for example for a further 1 ms after OUT 2 has become "low") in order to keep the processing signal available and to ensure the reading thereof (step 34F).

Figure 13:
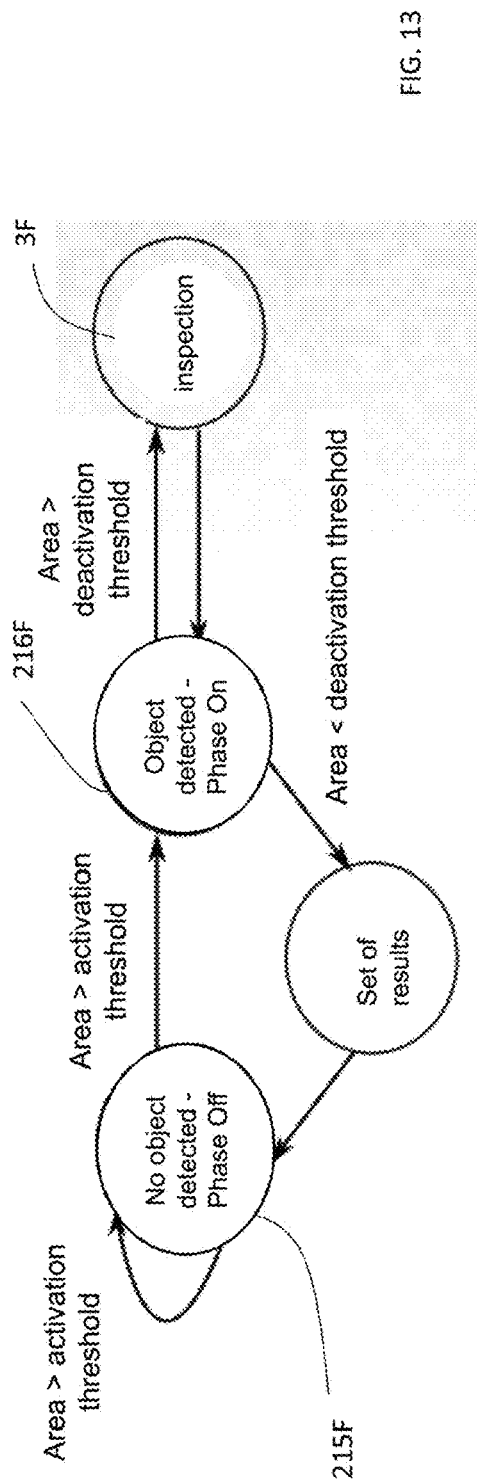

An example of this processing is represented in FIG. 13. For example, the Phase On step begins when the position of the object (image 10 in FIG. 11) within the field framed by the sensor occupies an area such that the output image at the output from the step 214F exceeds a certain said activation threshold (step 215F). From this moment in time the images are acquired. Additionally, as soon as this area returns below the threshold, the images obtained are no longer supplied to the input to the next step of classification 3F. The acquired images 10' are sent as input to the classification step 3F.

The value of the threshold of the area is obtained from a blob analysis. From step 1F here for example, the size of the blob, the binarization parameters, etc., are supplied as descriptors.

The inspection step 3F takes as an input the output of the detection step, i.e., the images 10', together with the difference descriptor 9 given in step 1F and classifies the object as GOOD or NOT-GOOD. The classification of the object can be performed by means of a linear classifier, an SVM, or a neural network.

The invention claimed is:

1. A method for detecting and classifying a not-known object under inspection to be acceptable or unacceptable by a device having a two-dimensional field of view, the method including:
    a learning step comprising:
        positioning a first known object considered to be acceptable in the field of view of the device having a first plurality of visual elements and obtaining a first reference image thereof;
        positioning a second known object considered to be not acceptable having a second plurality of visual elements in the field of view of the device, and obtaining a second reference image thereof, the second known object having a visual element of the second plurality distinct from the first plurality and the remaining visual elements of the second plurality equal to those of the first plurality;
        identifying a distinct characteristic between the first reference image of the first known object and the second reference image of the second known object and associating thereto a difference descriptor allowing to associate the first known object and the second known object to two distinct classes; and
        identifying a common characteristic between image of the first known object and the second reference image of the second known object and associating thereto an equality descriptor relative to common elements between the first and second plurality of visual elements;
    a detection step including:
        detecting an image of a third not-known object
        processing the detected image; and
        determining the image to be a complete image if the image of the third not-known object include required visual elements for classification of the third not-known object based on the equality descriptor;
    an inspection step, including:
        classifying the third not-known object as either acceptable or not acceptable based on an analysis of only images previously determined to be a complete image during the detection step and of the difference descriptor.

2. The method according to claim 1, wherein detecting an image of a third not-known object having the plurality of visual elements includes: moving the third not-known object within the field of view of the sensor.

3. The method according to claim 1, including the step of emitting a signal based on the classification of the third not-known object.

4. The method according to claim 1, including the step of processing the first or the second image through one or more of:
    thresholding,
    binarization,
    edge detection,
    image logic combinations,
    image linear transformations,
    in order to obtain the equality descriptor or the difference descriptor.

5. The method according to claim 1, wherein accepting the image as a complete image including the plurality of visual elements based on the equality descriptor includes:
    determining a two-dimensional shape of the third not-known object in the image; and
    accepting the image as a complete image if a number of pixels within the two-dimensional shape is above a threshold.

6. The method according to claim 1, wherein accepting the image as a complete image including the plurality of visual elements based on the equality descriptor includes:
    determining the presence of blob and/or a blob size in the image of the third not-known object; o Accepting the image as a complete image if the blob is present or its size is higher or lower than a threshold value.

7. The method according to claim 1, wherein classifying the third not-known object based on an analysis of the complete image and of the difference descriptor includes giving as an input the complete image and the difference descriptor to an algorithm of:
    a support vector machine (SVM), or
    a neural network, or
    a linear classifier.

8. The method according to claim 1, wherein the step of positioning a first known object in the field of view of the sensor having a plurality of visual elements and obtaining a first image includes one or more of:
    determining parameters for a suitable focusing of the third not-known object;

configuring photometric parameters including exposure time and gain.

9. The method according to claim 1, wherein the visual element of the second plurality distinct from the first plurality includes alternatively:
presence or absence of a cap;
opening or closing of a cap;
distinct orientations of a cap.

10. The method according to claim 1, wherein the step of identifying a common characteristic between the image of the first known object and the image of the second known object and associating thereto an equality descriptor relative to common elements between the first and second plurality of visible elements includes:
creating a mask comprising a plurality of areas, the mask being adapted to, when associated to the image of the third not-known object, select areas of the third image to be kept and areas of the third image to be discarded.

11. The method according to claim 5, wherein classifying the third not-known object based on an analysis of the complete image and of the difference descriptor includes giving as an input the complete image and the difference descriptor to an algorithm of:
a support vector machine (SVM), or
a neural network, or
a linear classifier.

12. The method according to claim 6, wherein classifying third not-known object based on an analysis of the complete image and of the difference descriptor includes giving as an input the complete image and the difference descriptor to an algorithm of:
a support vector machine (SVM), or
a neural network, or
a linear classifier.

13. The method according to claim 9, wherein the step of identifying a common characteristic between the image of the first known object and the image of the second known object and associating thereto an equality descriptor relative to common elements between the first and second plurality of visible elements includes: creating a mask comprising a plurality of areas, the mask being adapted to, when associated to the image of the third not-known object, select areas of the third image to be kept and areas of the third image to be discarded.

14. The method according to claim 11, wherein the step of identifying a common characteristic between the image of the first known object and the image of the second known object and associating thereto an equality descriptor relative to common elements between the first and second plurality of visible elements includes: creating a mask comprising a plurality of areas, the mask being adapted to, when associated to the image of the third not-known object, select areas of the third image to be kept and areas of the third image to be discarded.

15. The method according to claim 12, wherein the step of identifying a common characteristic between the image of the first known object and the image of the second known object and associating thereto an equality descriptor relative to common elements between the first and second plurality of visible elements includes: creating a mask comprising a plurality of areas, the mask being adapted to, when associated to the image of the third not-known object, select areas of the third image to be kept and areas of the third image to be discarded.

16. A device for detecting and classifying objects under inspection as either acceptable or not acceptable, including:
a two-dimensional emitter of luminous radiation adapted to illuminate a region in the space;
a two-dimensional receiver, including an array of photo sensitive cells, adapted to detect luminous energy spread by an object illuminated by the emitter and adapted to output a signal in form of function images of the luminous energy;
a processing unit of the signal outputting from the receiver, the unit being programmed for being alternatively in a learning mode and in a detection and inspection mode, wherein in the learning mode it is adapted to:
acquire a first image of a first known object considered to be acceptable having a plurality of visual elements placed in the field of view of the receiver;
acquire a second image of a second known object considered to be not acceptable having one second plurality of visual elements, the second known object having a visual element of the second plurality distinct from the first plurality and the remaining visual elements of the second plurality equal to those of the first one;
identify a distinct characteristic between the image of the first known object and the image of the second known object and associate thereto a difference descriptor allowing to associate the first known object and the second known object to two distinct classes;
identify a common characteristic between the image of the first known object and the image of the second known object and associate thereto an equality descriptor relative to common elements between the first and second plurality of visual elements;
and in the detection and inspection steps it is adapted to:
acquire an image of a third not-known object having the first or the second plurality of visual elements;
determine the image to be a complete image if the image of the third not-known object include required visual elements for classification of the third not-known object based on the equality descriptor;
classify the third not-known object as either acceptable or not acceptable based on an analysis of only images previously determined to be a complete image and on the difference descriptor.

17. The device according to claim 16, wherein the two-dimensional emitter includes a LED.

18. The device according to claim 17, wherein the two-dimensional receiver includes an image sensor.

19. The device according to claim 16, including a result management unit, adapted to change a state of an output of the device based on the result obtained by the classification.

20. The device according to claim 18, including a result management unit, adapted to change a state of an output of the device based on the result obtained by the classification.

* * * * *